United States Patent
Park et al.

(10) Patent No.: US 10,019,199 B2
(45) Date of Patent: Jul. 10, 2018

(54) CONTROLLER COUPLED TO SEMICONDUCTOR MEMORY DEVICE AND OPERATING METHOD THEREOF

(71) Applicant: SK hynix Inc., Gyeonggi-do (KR)

(72) Inventors: Se Chun Park, Seoul (KR); Young Dong Roh, Gyeonggi-do (KR); Kang Wook Lee, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 43 days.

(21) Appl. No.: 15/160,782

(22) Filed: May 20, 2016

(65) Prior Publication Data
US 2017/0192719 A1    Jul. 6, 2017

(30) Foreign Application Priority Data

Dec. 31, 2015    (KR) .................. 10-2015-0190805

(51) Int. Cl.
G06F 3/06    (2006.01)
(52) U.S. Cl.
CPC .......... *G06F 3/0659* (2013.01); *G06F 3/064* (2013.01); *G06F 3/065* (2013.01); *G06F 3/0619* (2013.01); *G06F 3/0679* (2013.01)
(58) Field of Classification Search
CPC ..... G06F 3/0659; G06F 3/0619; G06F 3/0679
See application file for complete search history.

(56) References Cited

U.S. PATENT DOCUMENTS

| | | | | |
|---|---|---|---|---|
| 2009/0164704 A1* | 6/2009 | Kanade | ............... | G06F 11/1068 711/103 |
| 2012/0221921 A1* | 8/2012 | Masuo | .................. | G06F 11/141 714/758 |
| 2012/0297170 A1 | 11/2012 | Abdallah | | |
| 2015/0301763 A1* | 10/2015 | Shaharabany | ........ | G06F 3/0613 711/115 |
| 2016/0139837 A1* | 5/2016 | Welker | .................. | G06F 3/0659 714/6.11 |

FOREIGN PATENT DOCUMENTS

KR    1020140083471    7/2014

* cited by examiner

*Primary Examiner* — Edward J Dudek, Jr.
(74) *Attorney, Agent, or Firm* — IP & T Group LLP

(57) ABSTRACT

There are provided a controller coupled to a semiconductor memory device and an operating method thereof. A controller having improved operation speed includes a command generation unit for generating commands to be performed by a semiconductor memory device, a command queue for storing the commands and providing at least one command among the stored commands to the semiconductor memory device, and a command removal unit for, if the semiconductor memory device fails in the performance of the at least one command output from the main command queue, removing the at least one command and related commands of the at least one command from the command queue.

17 Claims, 10 Drawing Sheets

FIG. 2
BLK0
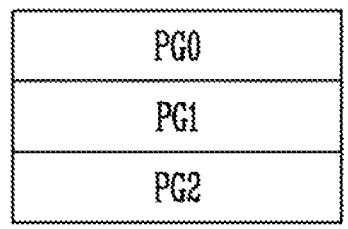
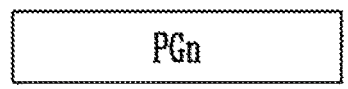

CONTROLLER COUPLED TO SEMICONDUCTOR MEMORY DEVICE AND OPERATING METHOD THEREOF

CROSS-REFERENCE TO RELATED APPLICATION

The present application claims a priority to Korean patent application number 10-2015-0190805 filed on Dec. 31, 2015, the disclosure of which is incorporated herein by reference in its entirety.

BACKGROUND

1. Field

An aspect of the present disclosure relates generally to a controller for controlling a semiconductor memory device and an operating method thereof.

2. Description of the Related Art

A semiconductor memory device is a memory device implemented using a semiconductor such as silicon (Si), germanium (Ge), gallium arsenide (GaAs), or indium phosphide (InP). A semiconductor memory device is generally classified into a volatile memory device and a nonvolatile memory device.

The volatile memory loses stored data when a power supply is turned off. Examples of a volatile memory include a static random access memory (SRAM), a dynamic RAM (DRAM), a synchronous DRAM (SDRAM), and the like. The nonvolatile memory is a memory device which retains stored data even when a power supply is cut off. Examples of a nonvolatile memory include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. A flash memory is generally classified into a NOR type flash memory and a NAND type flash memory.

SUMMARY

Embodiments of the present disclosure provide a controller having improved operation speed and an operating method thereof.

According to an aspect of the present disclosure, there is provided a controller for controlling a semiconductor memory device, the controller including: a command generation unit configured to generate commands to be performed by the semiconductor memory device; a main command queue configured to input/output the generated commands; and a command removal unit configured to, if the semiconductor memory device fails in the performance of at least one command output from the main command queue, remove related commands of the at least one command from the main command queue.

According to an aspect of the present disclosure, there is provided a controller for controlling a semiconductor memory device, the controller including: a command generation unit configured to generate commands to be performed by the semiconductor memory device; a main command queue configured to input/output the generated commands; and a command mirroring unit configured to generate mirroring commands by mirroring the generated commands, wherein, if the semiconductor memory device fails in the performance of at least one command output from the main command queue, the command mirroring unit removes related commands of the at least one command from the mirroring commands.

According to an aspect of the present disclosure, there is provided a method of operating a controller for controlling a semiconductor memory device, the method including: generating a command to be performed by the semiconductor memory device; inputting the generated command to a main command queue for inputting/outputting the generated command; determining whether the semiconductor memory device falls in the performance of at least one command output from the main command queue; and if the semiconductor memory device fails in the performance of the at least one command output from the main command queue, removing related commands of the at least one command from the main command queue.

BRIEF DESCRIPTION OF THE DRAWINGS

Example embodiments of the present disclosure will now be described more fully hereinafter with reference to the accompanying drawings; however, the invention may be embodied in different forms and should not be construed as being limited to the embodiments set forth herein. Rather, these embodiments are provided so that this disclosure will be thorough and complete, and will fully convey the invention to those skilled in the relevant art.

In the drawings, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 2 is a diagram illustrating an example configuration of any one of a plurality of memory blocks included in the memory system of FIG. 1.

DETAILED DESCRIPTION

Figure 1:
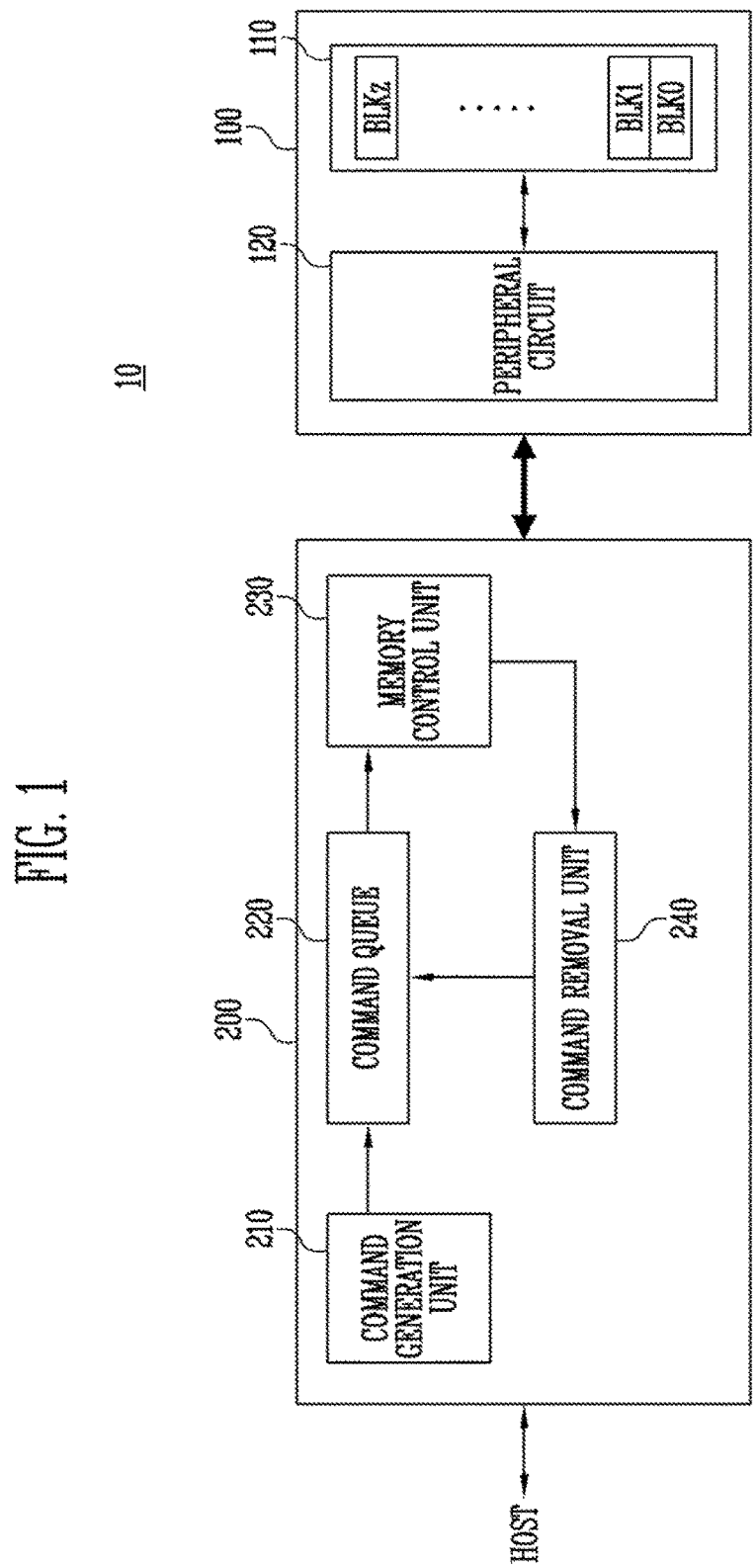
FIG. 1 is a block diagram illustrating a memory system including a semiconductor device, a controller and a host, according to an embodiment of the present disclosure.

The specific description (structural or functional) disclosed herein in reference with the drawings is merely illustrative for the purpose of describing various embodiments according to the concept of the present disclosure. However, it is noted, that the present invention and the described embodiments can be implemented in various other forms, and cannot be construed as being limited to the specific description set forth herein.

Many other embodiments and variation thereof according to the concept of the present disclosure may be envisaged by those skilled in the art include all changes, equivalents, or substitutes that do not depart from the spirit and/or scope of the present disclosure.

While terms such as "first" and "second" may be used to describe various components, such components must not be understood as being limited to the above terms. The above terms are used only to distinguish one component from another. For example, a first component may be referred to as a second component without departing from the scope of rights of the present disclosure, and likewise a second component may be referred to as a first component.

It will be understood that when an element is referred to as being "connected" or "coupled" to another element, it can be directly connected or coupled to the other element or intervening elements may also be present. In contrast, when an element is referred to as being "directly connected" or "directly coupled" to another element, no intervening elements are present. Meanwhile, other expressions describing relationships between components such as "between," "immediately between" or "adjacent to" and "directly adjacent to" may be construed similarly.

The terms used in the present application are merely used to describe particular embodiments, and are not intended to limit the present disclosure. Singular forms in the present disclosure are intended to include the plural forms as well, unless the context clearly may indicate otherwise. It will be further understood that terms such as "comprising," "including," or "having," are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

So far as not being differently defined, all terms used herein including technical or scientific terminologies have meanings that they are commonly understood by those skilled in the art to which the present disclosure pertains. The terms having the definitions as defined in the dictionary should be understood so that they have meanings consistent with the context of the related technique. So far as not being clearly defined in this application, terms should not be understood in an ideally or excessively formal way.

Hereinafter, exemplary embodiments of the present disclosure will be described in detail with reference to the accompanying drawings.

FIG. 1 is a block diagram illustrating a memory system 10 according to an embodiment of the present disclosure.

FIG. 2 is a diagram illustrating any one memory block BLK0 of a plurality of memory blocks BLK0 to BLKz included in a memory cell array 110 of FIG. 1.

Referring to FIG. 1, the memory system 10 may include a semiconductor memory device 100 and a controller 200.

The semiconductor memory device 100 may be a nonvolatile memory device. In an embodiment, the semiconductor memory device 100 may be a flash memory device. For example, the semiconductor memory device 100 may be a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), and the like.

The semiconductor memory device 100 may be implemented in a three-dimensional (3D) array structure. The present disclosure may be applied not only to a flash memory device in which a charge storage layer is formed by a conductive floating gate (FG) but also to a charge trap flash (CTF) memory in which a charge storage layer is formed of an insulation film.

The semiconductor memory device 100 may receive a command and an address from the controller 200 through a channel, and access an area selected by the address in a memory cell array 110. That is, the semiconductor memory device 100 may perform an internal operation corresponding to the command with respect to the memory area selected by the address.

The semiconductor memory device 100 may operate in response to control of the controller 200. The semiconductor memory device 100 may program data under the control of the controller 200, read data stored therein under the control of the controller 200, and or erase data stored therein under the control of the controller 200.

For example, in a program operation, the semiconductor memory device 100 may program data in the memory area selected by the received address. In a read operation, the semiconductor memory device 100 may read data from the memory area selected by the received address. In an erase operation, the semiconductor memory device 100 may erase data stored in the memory area selected by the received address.

The semiconductor memory device 100 may include the memory cell array 110 and a peripheral circuit 120 for driving the memory cell array 110. The memory cell array 110 may include a plurality of memory blocks BLK0 to BLKz. Each memory block, may include a plurality of pages, and each page may include a plurality of memory cells (not shown) coupled to a word line. For example, as shown in FIG. 2 memory block BLK0 may include a plurality of pages PG0, PG1, PG2, . . . PGn.

The program and read operations of the semiconductor memory device 100 may be performed in a unit of a page. The erase operation of the semiconductor memory device 100 may be performed in a unit of a memory block.

The peripheral circuit 120 may operate in response to control of the controller 200.

In the program operation, the peripheral circuit 120 may receive a program command, a physical block address, and data from the controller 200. One memory block and one page included therein may be selected by the physical block address. The peripheral circuit 120 may program data in the selected page.

In a read operation, the peripheral circuit 120 may receive a read command and a physical block address from the controller 200. One memory block and one page included therein may be selected by the physical block address. The peripheral circuit 120 may read data from the selected page and output the read data to the controller 200.

In the erase operation, the peripheral circuit 120 may receive an erase command and a physical block address from the controller 200. One memory block may be selected by the physical block address. The peripheral circuit 120 may erase data of the memory block corresponding to the physical block address.

The controller 200 may control the overall operations of the semiconductor memory device 100. Specifically, the controller 200 may control the semiconductor memory device 100 to perform at least one of a program, read, and erase operation. In a program operation, the controller 200 may provide the semiconductor memory device 100 with a program command, an address, and data through the channel. In a read operation, the controller 200 may provide the semiconductor memory device 100 with a read command and an address through the channel. In an erase operation, the controller 200 may provide the semiconductor memory device 100 with an erase command and an address through the channel.

The controller 200 may access the semiconductor memory device 100 in response to a request from a host. The controller 200 may provide an interface for communicating with the host and the semiconductor memory device 100. The controller 200 may drive firmware for controlling the semiconductor memory device 100.

The controller 200 may include a command generation unit 210, a command queue 220, a memory control unit 230, and a command removal unit 240.

The command generation unit 210 may control the overall operations of the controller 200. The command generation unit 210 may generate a command and input the generated command to the command queue 220.

In an embodiment, when a request from the host is received, the command generation unit 210 may generate a command corresponding to the request and input the generated command to the command queue 220. The command corresponding to the request from the host may be at least one of a program, read, and erase commands.

In an embodiment, the command generation unit 210 may generate a command without any request from the host and input the generated command to the command queue 220. For example, the command generation unit 210 may generate a command for background operations, such as operations for wear leveling and for garbage collection of the semiconductor memory device 100.

In an embodiment, the command generation unit 210 may function as a flash translation layer (FTL). The command generation unit 210 may translate a logical block address included in a request into a physical block address. The command generation unit 210 may store the physical block address related to a corresponding command in a storage unit (not shown) inside the controller 200. The FTL may provide a may include for translating a logical address received from the host into a physical address of the semiconductor memory device 100. The FTL may maintain, as a table, mapping information on the relation between the logical address and the physical address.

The command queue 220 may be coupled between the command generation unit 210 and the memory control unit 230. The command queue 220 may be managed according to a first in first out (FIFO) method. The command queue 220 may receive a command from the command generation unit 210 and may output the received command to the memory control unit 230. Commands stored in the command queue 220 may be sequentially or randomly performed according to internal states of the semiconductor memory device 100 and the controller 200.

The memory control unit 230 may communicate with the semiconductor memory device 100 according to a command generated by the command generation unit 210. The memory control unit 230 may operate in response to control of the command generation unit 210. The memory control unit 230 may transmit a command output from the command queue 220 to the semiconductor memory device 100, thereby controlling the semiconductor memory device 100.

The memory control unit 230 may transmit, to the semiconductor memory device 100, a command and an address corresponding thereto.

Transmitting a read command for a selected page may include transmitting the read command and a physical block address indicating the selected page. Transmitting a program command for a selected page may include transmitting the program command, a physical block address indicating the selected page, and data to be programmed. Transmitting an erase command for a selected memory block may include transmitting the erase command and a physical block address indicating the selected memory block.

A defect may occur in the memory blocks BLK0 to BLKz constituting the memory cell array 110 of the semiconductor memory device 100. A memory block having a defect may be classified as a bad block. A bad block may be generated due to various causes. For example, the bad block may be generated due to a column fail, disturbance, wear-out, etc.

When a bad block is generated, the semiconductor memory device 100 may fail in the performance of a command, e.g., an erase command or a program command, which is transmitted from the controller 200. The semiconductor memory device 100 may in that case transmit a performance fail signal for the failed command to the controller 200.

The memory control unit 230 may receive a command performance result of the semiconductor memory device 100 with respect to the command transmitted from the controller 200.

When, for example, the performance of an erase command or a program command fails, a command for a physical block address equal to that of the command of which performance has failed may be included in subsequent commands stored in the memory queue 220. Therefore, it may be required to remove such subsequent command which if allowed to perform will also fail, from the plurality of commands included in the command queue 220 and wait to be executed.

The command removal unit 240 may be coupled between the command queue 220 and the memory control unit 230. The command removal unit 240 may remove commands which are unnecessary to be performed because they will likely fail among the commands included in the command queue 220. In order to detect commands which are unnecessary to be performed, the command removal unit 240 may receive a command performance result from the semiconductor memory device 100. For example, the memory control unit 230 may transmit the command performance result received from the semiconductor memory device 100 to the command removal unit 240.

For example, the command removal unit 240 may receive, from the memory control unit 230, a command of which performance has failed and a physical block address corresponding to the corresponding command.

The command removal unit 240 may search commands related to the command of which performance has failed in the memory queue 220. The related commands may be commands for a physical block address equal to that corresponding to the command of which performance has failed.

In an embodiment, the related commands may have a physical block address different from that corresponding to the command of which performance has failed. Specifically, the semiconductor memory device 100 may perform one operation achieved by performing a plurality of commands. For example, the semiconductor memory device 100 may perform one operation achieved by performing a plurality of commands including garbage collection, wear leveling, copy-back, merge, bad block management, etc. Operation commands required to perform the one operation may include a plurality of commands. In an embodiment, the related commands may be operation commands to which the command of which performance has failed belongs. In an embodiment, the plurality of commands may include at least one of a program, read, or erase commands.

The command removal unit 240 may remove the searched related commands from the memory queue 220. The command removal unit 240 may access commands of the command queue 220. If the command removal unit 240 removes the related commands from the memory queue 220, the memory queue 220 may dequeue subsequent commands and transmit the dequeued commands to the memory control unit 230.

Although not shown in FIG. 1, the controller 200 may further include a memory interface for communicating with the semiconductor memory device 100. The memory interface may include a protocol for communicating with the semiconductor memory device 100. For example, the memory interface may include at least one of a flash interface, such as a NAND interface and a NOR interface.

The controller 200 may further include a host interface for exchanging data between the host and the controller 200. The host interface may include a protocol for communication between the host and the controller 200. In an embodiment, the controller 200 may be configured to communicate with the external (host) through at least one of various interface protocols, such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a private protocol and the like.

The controller 200 may further include a storage unit. The storage unit may be used as at least one of an operation memory of a processor, a buffer memory between the semiconductor memory device 100 and the host, and a cache memory between the semiconductor memory device 100 and the host. Also, the controller 200 may be used as a buffer for arbitrarily storing data input from the semiconductor memory device 100. In an embodiment, the storage unit may include at least one of various randomly accessible memories, such as a static RAM (SRAM), a dynamic RAM (DRAM), a synchronous DRAM (SDRAM), a phase-change RAM (PRAM), a magnetic RAM (MRAM), a resistive RAM (RRAM), a ferroelectric RAM (FRAM) and the like.

Figure 3:
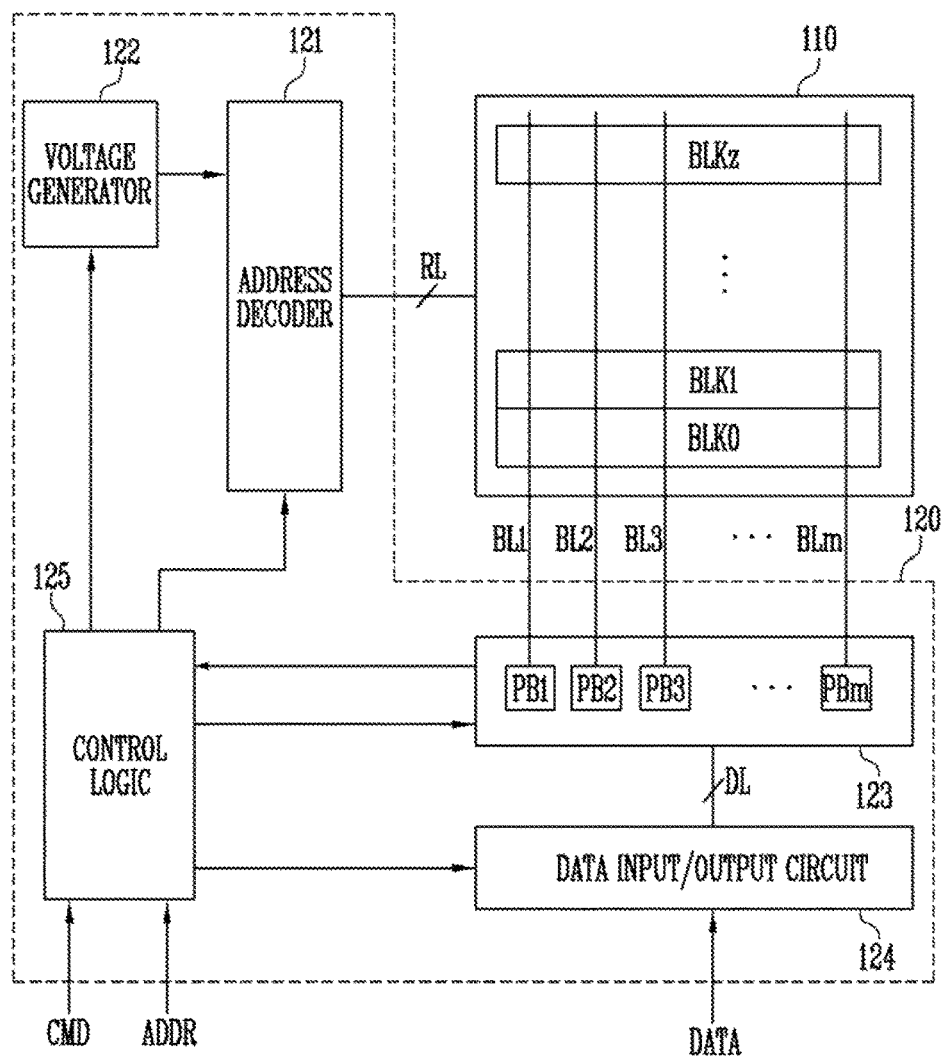
FIG. 3 is a block diagram illustrating an example of a structure of the semiconductor memory device of FIG. 1.

FIG. 3 is a block diagram illustrating an example configuration for the semiconductor memory device of FIG. 1.

Referring to FIG. 3, the semiconductor memory device 100 may include a memory cell array 110 and a peripheral circuit 120. The peripheral circuit 120 may include an address decoder 121, a voltage generator 122, a read/write circuit 123, a data input/output circuit 124, and a control logic 125.

The memory cell array 110 may include a plurality of memory blocks BLK0 to BLKz. The plurality of memory blocks BLK0 to BLKz may be coupled to the address decoder 121 through row lines RL, and to the read/write circuit 123 through bit lines BL1 to BLm. Each of the plurality of memory blocks BLK0 to BLKz may include a plurality of memory cells. In an embodiment, the plurality of memory cells may be nonvolatile memory cells.

Each of zeroth to zth memory blocks BLK0 to BLKz may include a plurality of cell strings. For example, first to mth cell strings may be coupled to first to mth bit lines, respectively. Each of the first to mth cell strings may include a drain select transistor, a plurality of memory cells coupled in series, and a source select transistor. The drain select transistor may be coupled to a drain select line. First to nth memory cells may be coupled to first to nth word lines, respectively. Memory cells coupled to a single word line may constitute one page. The source select transistor may be coupled to a source select line. A drain of the drain select transistor may be coupled to a corresponding bit line. The drain select transistors of the first to mth cell strings may be coupled to the first to mth bit lines BL1 to BLm, respectively. A source of the source select transistor may be coupled to a common source line. In an embodiment, the common source line may be commonly coupled to the first to zth memory blocks BLK0 to BLKz. The drain select line, the first to nth word lines, and the source select line are included in the row lines RL. The drain select line, the first to nth word lines, and the source select line may be controlled by the address decoder 121. The common source line may be controlled by the control logic 125. The first to mth bit lines BL1 to BLm may be controlled by the read/write circuit 123.

The address decoder 121 may be coupled to the memory cell array 110 through the row lines RL. The address decoder 121 may operate in response to control of the control logic 125. The address decoder 121 may receive an address ADDR through the control logic 125.

In an embodiment, the program and read operations of the semiconductor memory device 100 may be performed in a unit of a page.

In the program and read operations, the address ADDR received from the control logic 125 may include a block address and a row address. The address decoder 121 may decode the block address in the received address ADDR. The address decoder 121 may select one memory block among the memory blocks BLK0 to BLKz according to the decoded block address.

The address decoder 121 may decode the row address in the received address ADDR. The address decoder 121 may select one word line of the selected memory block by applying voltages provided from the voltage generator 122 according to the decoded row address.

In the erase operation, the address ADDR may include a block address. The address decoder 121 may decode the block address and select one memory block according to the decoded block address. The erase operation may be performed on the entire or a portion of the selected memory block.

The address decoder 121 may decode row addresses in the received address ADDR. The address decoder 121 may select at least one word line of the selected memory block by applying voltages provided from the voltage generator 122 to the row lines RL according to the decoded row addresses.

In an embodiment, the address decoder 121 may include a block decoder, a word line decoder, an address buffer, and the like.

The voltage generator 122 may generate a plurality of voltages by using an external power voltage supplied to the semiconductor memory device 100. The voltage generator 122 may operate in response to control of the control logic 125.

In an embodiment, the voltage generator 122 may generate an internal power voltage by regulating the external power voltage. The internal power voltage generated by the voltage generator 122 may be used as an operation voltage of the semiconductor memory device 100.

In an embodiment, the voltage generator 122 may generate a plurality of voltages by using the external power voltage or the internal power voltage. For example, the voltage generator 122 may include a plurality of pumping capacitors for receiving the internal power voltage, and may generate a plurality of voltages by selectively activating the plurality of pumping capacitors in response to control of the control logic 125. The plurality of generated voltages may be applied to selected word lines by the address decoder 121.

In a program operation, the voltage generator 122 may generate a high-voltage program pulse and a pass pulse lower than the program pulse. In a read operation, the voltage generator 122 may generate a read voltage and a pass voltage higher than the read voltage. In an erase operation, the voltage generator 122 may generate an erase voltage.

The read/write circuit 123 may include a first to mth page buffers PB1 to PBm. The first to mth page buffers PB1 to PBm may be coupled to the memory cell array 110 through the respective first to mth bit lines BL1 to BLm. The first to mth page buffers PB1 to PBm may operate in response to control of the control logic 125.

The first to mth page buffers PB1 to PBm may communicate data with the data input/output circuit 124. In a program operation, the first to mth page buffers PB1 to PBm may receive data DATA to be stored through the data input/output circuit 124 and data lines DL.

In a program operation, the first to mth page buffers PB1 to PBm may transmit, to selected memory cells, the data DATA to be stored, which is received through the data input/output circuit 124, when a program pulse is applied to a selected word line. The memory cells of the selected page may be programmed according to the transmitted data DATA. A memory cell coupled to a bit line to which a program permission voltage is applied (e.g., a ground voltage) may have an increased threshold voltage. The threshold voltage of a memory cell coupled to a bit line to which a program prohibition voltage (e.g., a power voltage) is applied may be maintained. In a program verify operation, the first to mth page buffers PB1 to PBm read page data from the selected memory cells through the bit lines BL1 to BLm.

In a read operation, the read/write circuit 123 may read data DATA from memory cells of a selected page through the bit lines BL and output the read data DATA to the data input/output circuit 124. In an erase operation, the read/write circuit 123 may float the bit lines BL.

In an embodiment, the read/write circuit 123 may include a column select circuit.

The data input/output circuit 124 may be coupled to the first to mth page buffers PB1 to PBm through the data lines DL. The data input/output circuit 124 may operate in response to control of the control logic 125. In a program operation, the data input/output circuit 124 may receive data DATA to be stored from an external controller (not shown).

The control logic 125 may be coupled to the address decoder 121, the voltage generator 122, the read/write circuit 123, and the data input/output circuit 124. The control logic 125 may control overall operations of the semiconductor memory device 100. The control logic 125 may receive a command CMD and an address ADDR from the external controller. The control logic 125 may control the address decoder 121, the voltage generator 122, the read/write circuit 123, and the data input/output circuit 124 in response to the command CMD.

Figure 4:
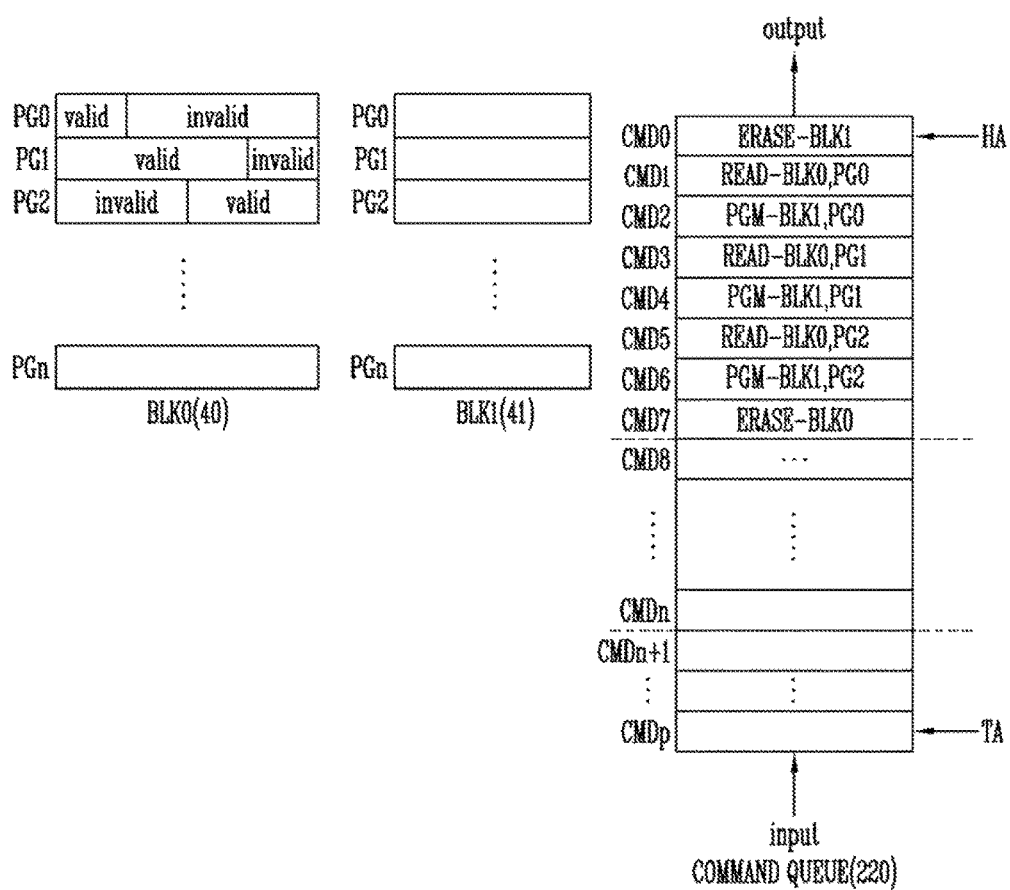
FIG. 4 is a diagram illustrating a method of removing commands, according to an embodiment of the present disclosure.

FIG. 4 is a diagram illustrating a method of removing commands according to an embodiment of the present disclosure.

Referring to FIG. 4, a memory block BLK0 40 in which valid data and invalid data may be stored and an empty memory block BLK1 41 in which any data is not stored may be included in the plurality of memory blocks included in the semiconductor memory device 100. For example, the zeroth memory block BLK0 40 may store valid data and invalid data in each of zeroth to second pages PG0 to PG2. The first memory block BLK1 41 may not store any data. The semiconductor memory device 100 may manage invalid pages so as to further extend the valid space of a memory block. For example, the semiconductor memory device 100 may store valid data in an empty memory block through an operation such as garbage collection and erase the entire bad block, thereby securing a memory capacity.

The command queue 220 of FIG. 4 may include commands for transferring valid data of the zeroth memory block 40 to the first memory block 41.

The command queue 220 may store a plurality of commands CMD0 to CMDp between a head address HA and a tail address TA. Zeroth to pth commands CMD0 to CMDp may be various types of commands. Each of the zeroth to pth commands CMD0 to CMDp may be, for example, any one of a program, read, and erase commands.

The head address HA may indicate a first command CMD0 of the command queue 220. The tail address TA may indicate the last command CMDp of the command queue 220. The command queue 220 may be managed according to the FIFO method. Therefore, the command generation unit 210 may generate a plurality of commands CMD0 to CMDp, and the plurality of commands CMD0 to CMDp may be stored in the order in which they are received. If a new command is received in the command queue 220, the tail address TA may indicate the corresponding new command. The command indicated by the head address HA of the command queue 220 may be transmitted.

The semiconductor memory device 100 may perform a single operation achieved by performing a plurality of commands including garbage collection, wear leveling, copy-back, merge, bad block management, etc. In this case, operation commands required to perform the single operation may include a plurality of commands. In an embodiment, the plurality of commands may include at least one of a program, read, and erase commands.

In FIG. 4, the zeroth to seventh commands CMD0 to CMD7 are commands for performing an operation of storing valid data of the zeroth memory block BLK0 40 in the first memory block BLK1 41.

The zeroth command CMD0 is an erase command ERASE for erasing the first memory block BLK1 41. The first command CMD1 is a read command READ for the zeroth page PG0 of the zeroth memory block BLK0 40. The second command CMD2 is a program command PGM for a zeroth page PG0 of the first memory block BLK1 41. The third command CMD3 is a read command READ for the first page PG1 of the zeroth memory block BLK0 40. The fourth command CMD4 is a program command PGM for a first page PG1 of the first memory block BLK1 41. The fifth command CMD5 is a read command READ for the second page PG2 of the zeroth memory block BLK0 40. The sixth command CMD6 is a program command PGM for a second page PG2 of the first memory block BLK1 41. The seventh command CMD7 is an erase command ERASE for the zeroth memory block BLK0 40. The valid data of the zeroth memory block BLK0 40 may be recorded in the first memory block BLK1 41 through the zeroth to seventh commands CMD0 to CMD7.

The eighth to nth commands CMD8 to CMDn may be commands for different memory blocks from the zeroth memory block BLK0 and the first memory block BLK1. Also, the (n+1)th to pth commands CMDn+1 to CMDp may be different commands for memory blocks from the eighth to nth commands CMD8 to CMDn. For example, the eighth to nth commands CMD8 to CMDn and the (n+1)th to pth commands CMDn+1 to CMDp may be commands for performing an arbitrary operation of the semiconductor memory device 100. In this case, the zeroth to seventh commands CMD0 to CMD7, the eighth to nth commands CMD8 to CMDn, and the (n+1)th to pth commands CMDn+1 to CMDp may be operation commands for performing independent operations, respectively.

While commands of the memory queue 220 are being sequentially performed, the performance of any one command may fall. In this case, it is unnecessary to perform commands related to the command of which performance has failed among subsequent commands, and hence the related commands are to be removed.

If the semiconductor memory device 100 fails in the performance of the zeroth command CMD0, it is unnecessary to perform the first to seventh commands CMD1 to CMD7. Therefore, it is required to remove the first to seventh commands CMD1 to CMD7 from the memory queue 220. To this end, the controller 200 may remove the commands related to the command of which performance has failed. If the performance of the zeroth command CMD0 fails in FIG. 4, the controller 200 removes the first to seventh commands CMD1 to CMD7 from the memory queue 220, and dequeues the eighth command CMD8 and then transmits the dequeued command CMD8 to the semiconductor memory device 100.

Figure 5:
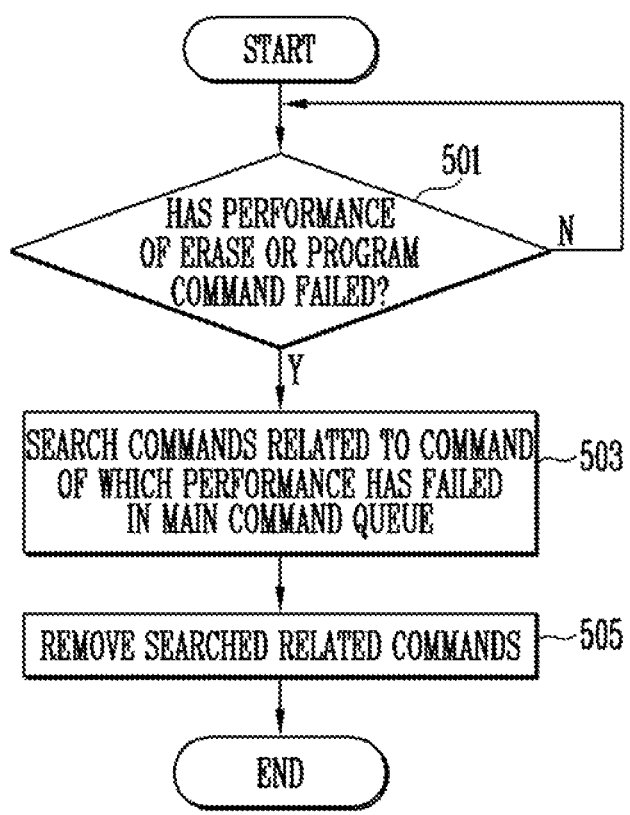
FIG. 5 is a flowchart illustrating an example of an operation of a controller of FIG. 1.

FIG. 5 is a flowchart illustrating an operation of the controller 200 of FIG. 1.

Referring to FIG. 5, in step 501, the controller 200 may determine whether the performance of an erase or program command has failed. The controller 200 may receive a performance result of the erase or program command from the semiconductor memory device 100 of FIG. 1. If the semiconductor memory device 100 does not fall in the performance of the erase or program command, the controller 200 returns to step 501.

If it is determined in step 501 that the semiconductor memory device 100 has failed in the performance of the erase or program command, in step 503, the controller 200 may search commands related to the command of which performance has failed. The related commands may be commands for a physical block address equal to that corresponding to the command of which performance has failed.

In an embodiment, the related commands may be operation commands to which the command of which performance has failed belongs. That is, the semiconductor memory device 100 may perform one operation achieved by performing a plurality of commands including garbage collection, wear leveling, copy-back, merge, bad block management, etc. In this case, operation commands required to perform the one operation may include a plurality of commands. In an embodiment, the plurality of commands may include program, read, or erase commands.

In step 505, the controller 200 may remove the command of which performance has failed and the searched related commands from the memory queue 220 of FIG. 1. The controller 200 may remove the command of which performance has failed and the related commands, and dequeue a subsequent command and then transmit the dequeued command to the semiconductor memory device 100.

Figure 6:
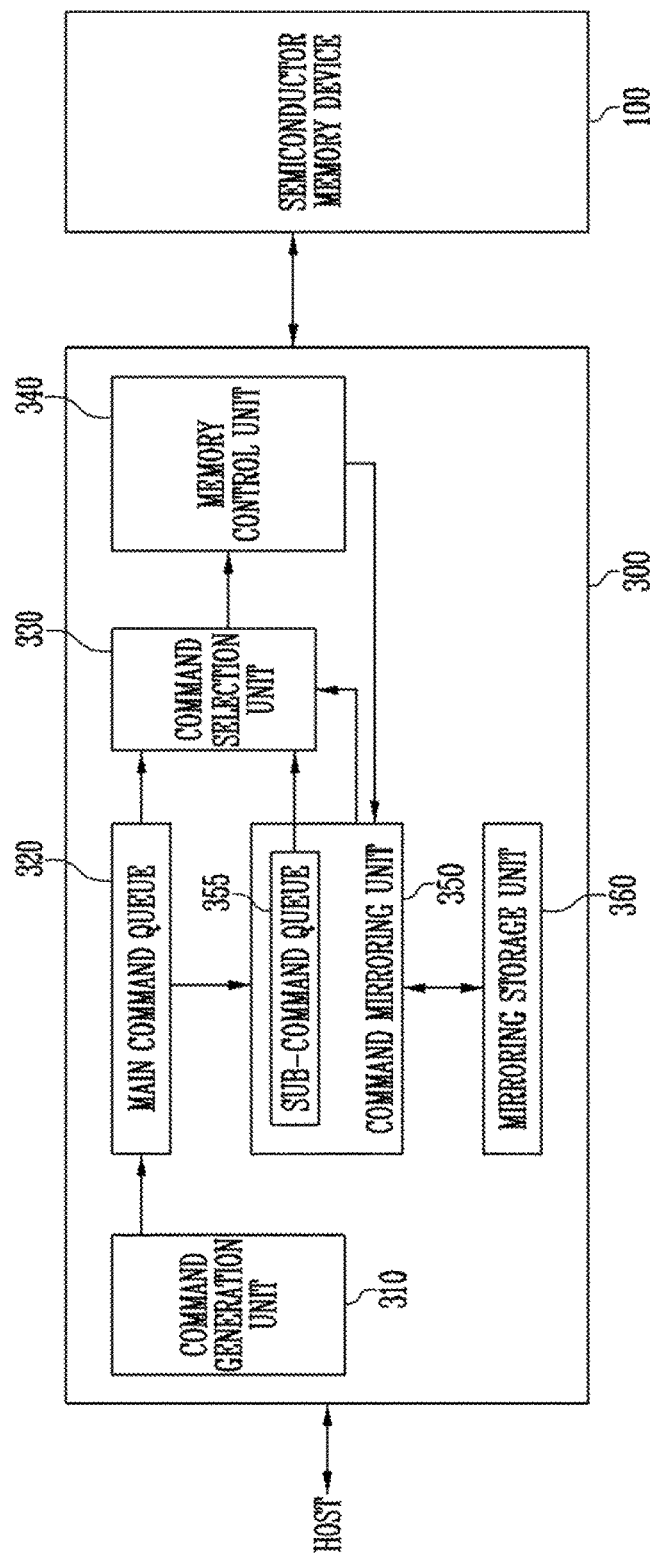
FIG. 6 is a block diagram illustrating an example of a structure of a controller, according to another embodiment of the present disclosure.

FIG. 6 is a block diagram illustrating a structure of a controller 300, according to another embodiment of the present disclosure.

Referring to FIG. 6, a semiconductor memory device 100 is identical to the semiconductor memory device 100 described with reference to FIG. 1.

The controller 300 may control the semiconductor memory device 100. The controller 300 may access the semiconductor memory device 100 in response to a request from a host. For example, the controller 300 may control at least one of a read, program, erase, and background operations of the semiconductor memory device 100. The controller 300 provides an interface between the semiconductor memory device 100 and the host. The controller 300 may drive firmware for controlling the semiconductor memory device 100.

The controller 300 may include a command generation unit 310, a main command queue 320, a command selection unit 330, a memory control unit 340, a command mirroring unit 350 including a sub-command queue 355, and a mirroring storage unit 360.

The command generation unit 310 and the main command queue 320 may be configured and operated identically to the command generation unit 210 and the command queue 220, which are described with reference to FIG. 1.

The command selection unit 330 is coupled to the main command queue 320, the command mirroring unit 350, and the memory control unit 340. The command selection unit 330 selects any one of the main command queue 320 and the sub-command queue 355 under control of the command mirroring unit 350. For example, when a control signal provided from the command mirroring unit 350 is disabled, the command selection unit 330 outputs a command stored in the main command queue 320 and transmits the output command to the memory control unit 340. When the control signal provided from the commanding mirroring unit 350 is enabled, the command selection unit 330 outputs a command stored in the sub-command queue 355 and transmits the output command to the memory control unit 340.

The memory control unit 340 may communicate with the semiconductor memory device 100 according to an input command. The memory control unit 340 may operate in response to control of the command generation unit 310. The memory control unit 340 transmits a command received through the command selection unit 330 to the semiconductor memory device 100, thereby controlling the semiconductor memory device 100. The memory control unit 340 may transmit, to the semiconductor memory device 100, a command and an address corresponding to the corresponding command. In an embodiment, the memory control unit 340 receives a command performance result of the semiconductor memory device 100 with respect to the command transmitted by the controller 300.

The command mirroring unit 350 is coupled to the main command queue 320, the command selection unit 330, the memory control unit 340, and the mirroring storage unit 360. According to the embodiment of the present disclosure, the command mirroring unit 350 may generate a mirroring command by mirroring a command input to the main command queue 320 and store the generated mirroring command in the mirroring storage unit 360. In an embodiment, the mirroring command may include a command indicating an operation of the semiconductor memory device 100 and a physical block address corresponding to the command.

In an embodiment, the command mirroring unit 350 may receive a command performance result from the semiconductor memory device 100. For example, the command mirroring unit 350 may receive, through the memory control unit 340, the command performance result received from the semiconductor memory device 100.

If the performance of the erase or program command fails, the command mirroring unit 350 may refer to mirroring commands stored in the mirroring storage unit 360.

The command mirroring unit 350 may remove related commands from the mirroring commands stored in the mirroring storage unit 360, based on the received command performance result. The related commands may be commands for a physical block address equal to that corresponding to the command of which performance has failed.

In various embodiments, the related commands may have a physical block address different from that corresponding to the command of which performance has failed. Specifically, the semiconductor memory device 100 may perform one operation achieved by performing a plurality of commands. For example, the semiconductor memory device 100 may perform one operation achieved by performing a plurality of commands including garbage collection, wear leveling, copy-back, merge, bad block management, etc. Operation commands required to perform the one operation may include a plurality of commands. In an embodiment, the related commands may be operation commands to which the command of which performance has failed belongs. In an embodiment, the plurality of commands may include program, read, or erase commands.

The command mirroring unit 350 may generate the sub-command queue 355, based on the mirroring commands from which the related commands to the command of which performance has failed are removed.

In an embodiment, the command mirroring unit 350 may generate the sub-command queue 355 configured with commands equal to the mirroring commands. The sub-command queue 355 has the same form as the main command queue 320, and may operate using the same method. The sub-command queue 355 may be managed according to the FIFO method. The sub-command queue 355 outputs a command to the command selection unit 330. Commands stored in the sub-command queue 355 may be sequentially or randomly performed according to internal states of the semiconductor memory device 100 and the controller 200.

The command mirroring unit 350 may control the command selection unit 330 to select the sub-command queue 355. For example, the command mirroring unit 350 may enable a control signal transmitted to the command selection unit 330, to control the command selection unit 330 to select the sub-command queue 355.

The command selection unit 330 may dequeue a command stored in the sub-command queue 355 and provide the dequeued command to the memory control unit 340. The memory control unit 340 may transmit, to the semiconductor memory device 100, the provided command and a stored physical block address related to the corresponding command.

Figure 7:
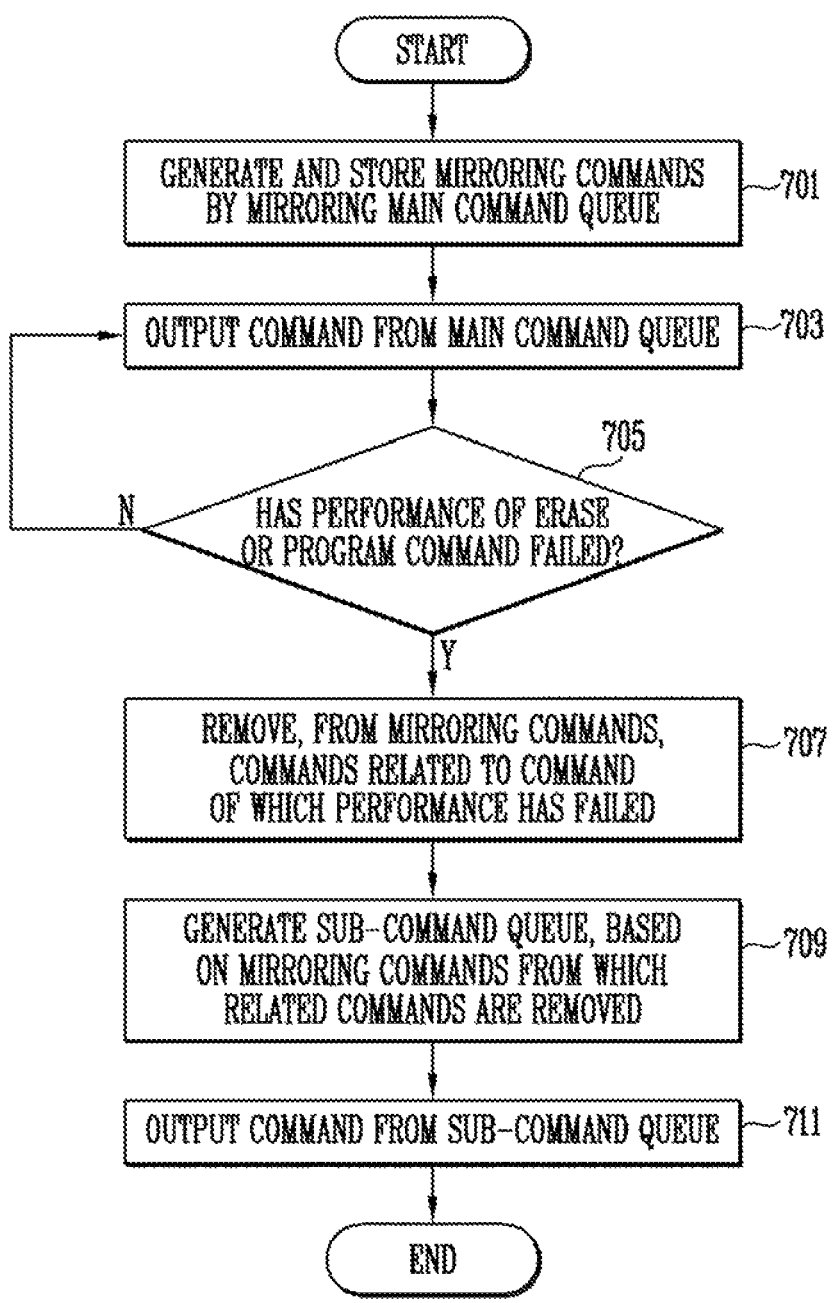
FIG. 7 is a flowchart illustrating an example of an operation of the controller of FIG. 6.

FIG. 7 is a flowchart illustrating an operation of the controller 300 of FIG. 6.

Referring to FIG. 7, in step 701, the controller 300 may generate mirroring commands by mirroring a main command queue 320 of FIG. 6. The controller 300 may store the generated mirroring commands in a separate storage unit.

The controller 300 may generate commands in response to or regardless of a request of the host. The generated commands are input to the main command queue 320. If commands are input to the main command queue 320, the controller 300 may generate mirroring commands by mirroring the input commands. Each of the generated mirroring commands may include a command and a physical block address corresponding to the corresponding command. In an embodiment, the controller 300 may store only the physical block addresses of the commands as the mirroring commands.

In step 703, the controller 300 outputs a command from the main command queue 320 to the semiconductor memory device 100. Specifically, the controller 300 dequeues a command stored in the main command queue 320 and transmits the dequeued command to the semiconductor memory device 100. The controller 300 may transmit, to the semiconductor memory device 100, a command and a physical block address corresponding to the corresponding command.

In step 705, the controller 300 determines whether the semiconductor memory device 100 has failed in the performance of an erase or program command. If the controller 300 transmits a command and a physical block address to the semiconductor memory device 100 in step 703, the controller 300 may receive a performance result of the command transmitted from the semiconductor memory device 100. If it is determined in step 705 that the performance of the erase or program command has not failed, the controller 300 may return to step 703 to output a command from the main command queue 320 to the semiconductor memory device 100. If it is determined in step 705 that the performance of the erase or program command has failed, the controller 300 may proceed to step 707.

In step 707, the controller 300 removes, from the stored mirroring commands, the command of which performance has failed and commands related to the command of which performance has failed. The related commands may be commands for a physical block address equal to that corresponding to the command of which performance has failed. In an embodiment, the related commands may be operation commands to which the command of which performance has failed belongs. In an embodiment, the plurality of commands may include program, read, or erase commands. Here, the operation commands may include a plurality of commands required to perform one operation. In an embodiment, the plurality of commands may include program, read, or erase commands.

In step 709, the controller 300 may generate a sub-command queue 355 of FIG. 6, based on the mirroring commands from which the related commands are removed. In an embodiment, the controller 300 may generate the sub-command queue 355 configured with commands equal to the mirroring commands from which the related commands are removed. In an embodiment, the sub-command queue 355 has the same form as the main command queue 320, and may operate using the same method. The sub-command queue 355 may be generated according to the FIFO method.

In step 711, the controller 300 dequeues one command among commands stored in the sub-command queue 355 and outputs the dequeued command 355. The controller 300 may sequentially or randomly output the commands stored in the sub-command queue 355. The controller 300 may transmit, the semiconductor memory device 100, a command stored in the sub-command queue 355 and a stored physical block address related to the corresponding command.

Figure 8:
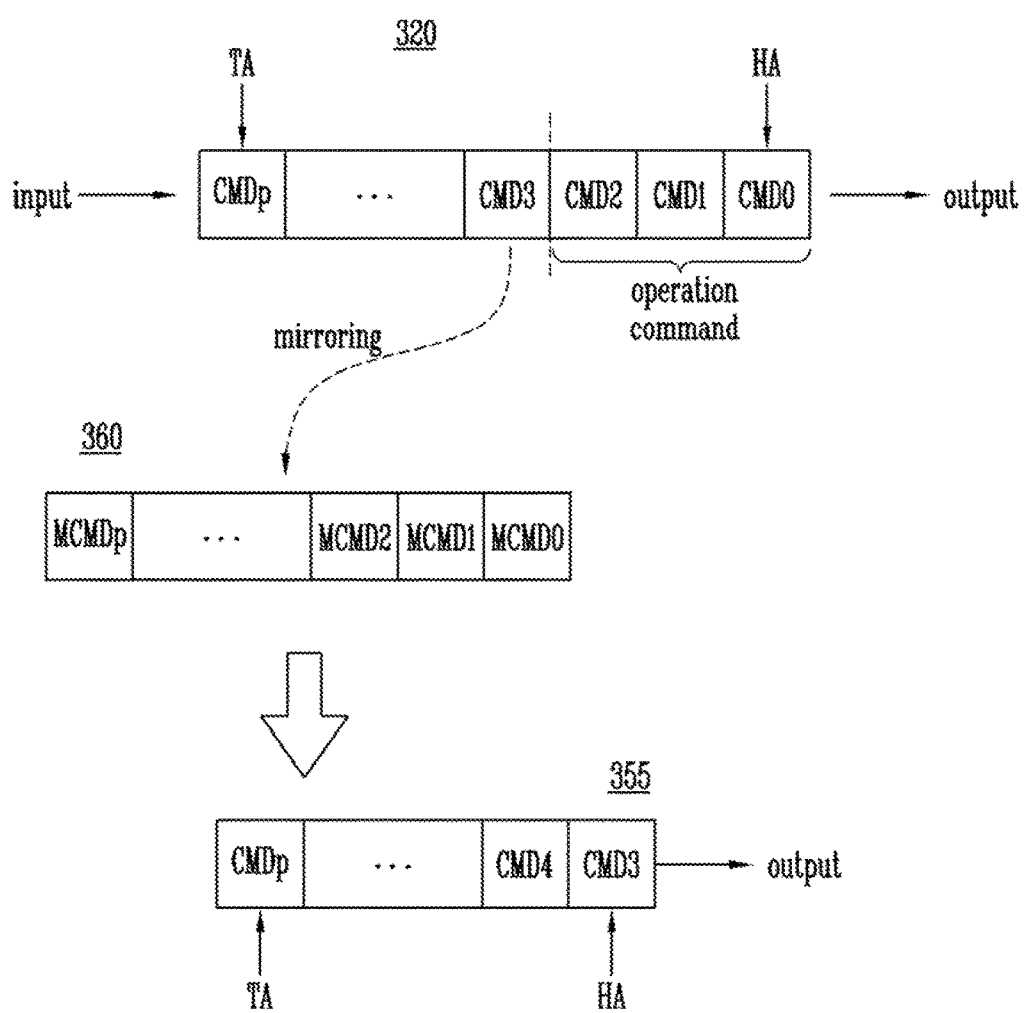
FIG. 8 is a diagram illustrating commands stored in a main command queue, a mirroring storage unit, and a sub-command queue, shown in FIG. 6.

FIG. 8 is a diagram illustrating commands stored in the main command queue 320, the mirroring storage unit 360, and the sub-command queue 355, shown in FIG. 6.

Referring to FIG. 8, the main command queue 320 may store a plurality of commands CMD0 to CMDp between a head address HA and a tail address TA. The command generation unit 310 may generate zeroth to pth commands CMD0 to CMDp. The zeroth to pth commands CMD0 to CMDp may be various types of commands. Each of the zeroth to pth commands CMD0 to CMDp may be any one of program, read, and erase commands.

The head address HA may indicate a first command CMD0 of the main command queue 320. The tail address TA may indicate the last command CMDp of the main command queue 320. The main command queue 320 may be managed according to the FIFO method. The command generation unit 310 may generate the plurality of commands CMD0 to CMDp, and the plurality of commands CMD0 to CMDp may be stored in the main command queue 320 in the order in which the commands CMD0 to CMDp are input. If a new command is received by the main command queue 320, the tail address TA may indicate the corresponding new command. The command indicated by the head address HA of the main command queue 320 may be output.

The commands CMD0 to CMDp stored in the main command queue 320 are mirrored to the mirroring storage unit 360. In FIG. 8, the zeroth command CMD0 is stored in the head address HA of the main command queue 320. The zeroth command CMD0 may be mirrored to be stored as a mirroring command MCMD0 in the mirroring storage unit 360.

It will be understood that, like the zeroth command CMD0, the first to pth commands CMD1 to CMDp may be mirrored.

In FIG. 8, a case where the zeroth to second commands CMD0 to CMD2 constitute one operation command will be described as an example. The third command CMD3 constitutes a different operation command from the zeroth to second commands CMD0 to CMD2. Therefore, if the performance of the zeroth command CMD0 fails, the controller 300 removes the zeroth command CMD0 and commands related to the zeroth command CMD0 among the commands stored in the mirroring storage unit 360. The related commands to the zeroth command CMD0 may be the first to second commands CMD1 to CMD2.

The controller 300 may remove the related commands in the mirroring storage unit 360, and may generate the sub-command queue 355, based on mirroring commands from which the related commands are removed. Therefore, if the performance of the zeroth command CMD0 fails, the zeroth to second commands CMD0 to CMD2 are removed, and the sub-command queue 355 is generated so that the third command CMD3 is positioned in the head address HA and is output to the semiconductor memory device 100.

In various embodiments, the controller 300 may directly remove related commands MCMD0 to MCMD2 from mirroring commands MCMD0 to MCMDp stored in the mirroring storage unit 360 and directly output a command (e.g., MCMD3) of the mirroring storage unit 360.

Figure 9:
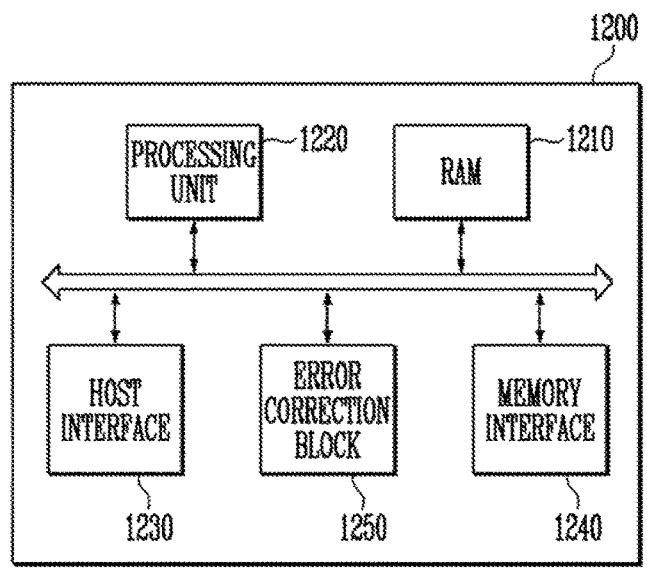
FIG. 9 is a block diagram illustrating an example embodiment for implementing the controller of FIG. 1 and the controller of FIG. 6.

FIG. 9 is a block diagram illustrating an embodiment 1200 for implementing the controller 200 of FIG. 1 and the controller 300 of FIG. 6.

Referring to FIG. 9, the controller 1200 may include a random access memory (RAM) 1210, a processing unit 1220, a host interface 1230, a memory interface 1240, and an error correction block 1250.

The processing unit 1220 may control the overall operations of the controller 1200. The RAM 1210 may be used as at least one of an operation memory of the processing unit 1220, a cache memory between a semiconductor memory device and a host (e.g., the semiconductor memory device 100 and the host of FIG. 1), and a buffer memory between the semiconductor memory device and the host. The processing unit 1220 and the RAM 1210 may perform functions of the command generation units 210 and 310 of FIGS. 1 and 6.

The host interface 1230 may include a protocol for exchanging data between the host and the controller 1200. In an embodiment, the controller 1200 may be configured to communicate with the host through at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a private protocol and the like.

The memory interface 1240 interfaces with the semiconductor memory device.

The error correction block 1250 may decode data received from the semiconductor memory device by using an error correction code.

Figure 10:
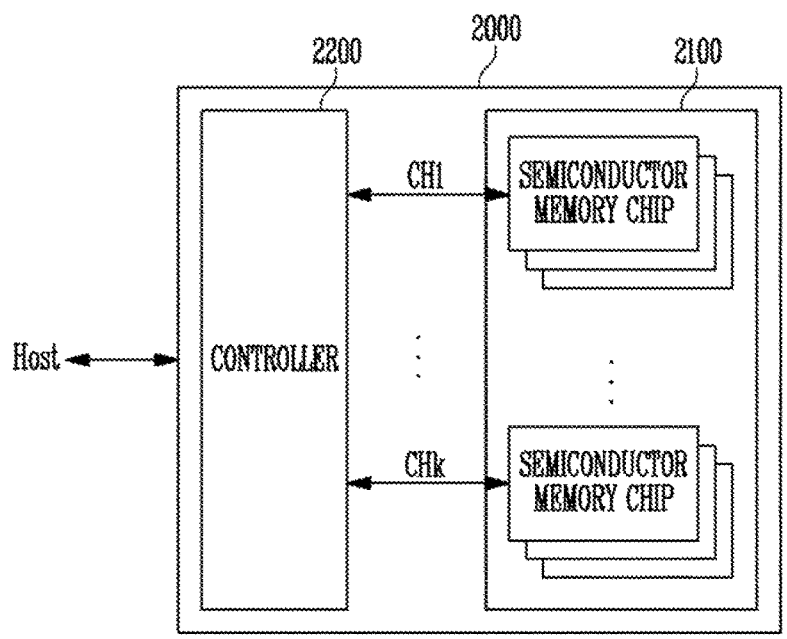
FIG. 10 is a block diagram illustrating an application example of the memory system of FIG. 1.

FIG. 10 is a block diagram illustrating an application example 2000 of the memory system 10 of FIG. 1.

Referring to FIG. 10, the memory system 2000 may include a semiconductor memory device 2100 and a controller 2200. The semiconductor memory device 2100 may include a plurality of semiconductor memory chips. The plurality of semiconductor memory chips may be divided into a plurality of groups.

In FIG. 10, it is illustrated that the plurality of groups communicate with the controller 2200 through first to kth channels CH1 to CHk. Each semiconductor memory chip may be configured and operated like the semiconductor memory device 100 described with reference to FIGS. 1 and 2.

Each group may be configured to communicate with the controller 2200 through one common channel. The controller 2200 may be configured identically to the controllers 200 and 300 described with reference to FIGS. 1 and 6. The controller 2200 may be configured to control the plurality of memory chips of the semiconductor memory device 2100 through the plurality of channels CH1 to CHk. In FIG. 10, it is illustrated that a plurality of semiconductor memory chips are coupled to one channel. However, it will be understood that the memory system 2000 may be modified so that one semiconductor memory chip is coupled to one channel.

The controller 2200 and the semiconductor memory device 2100 may be integrated into one semiconductor device. As an exemplary embodiment, the controller 2200 and the semiconductor memory device 2100 may be integrated into one semiconductor device, to constitute a memory card. For example, the controller 2200 and the semiconductor memory device 2100 may be integrated into one semiconductor device, to constitute a memory card such as a PC card (personal computer memory card international association (PCMCIA)), a compact flash (CF) card, a smart media card (SM or SMC), a memory stick, a multimedia card (e.g., MMC, RS-MMC or MMCmicro), an SD card (e.g., SD, miniSD, microSD or SDHC), a universal flash storage (UFS) and the like.

The controller 2200 and the semiconductor memory device 2100 may be integrated into one semiconductor device to constitute a semiconductor drive (e.g., solid state drive (SSD)). The semiconductor drive SSD may include a storage device configured to store data in a semiconductor memory. If the memory system 2000 is used as the semiconductor drive SSD, the operating speed of the host coupled to the memory system 2000 can be remarkably improved.

As another example, the memory system 2000 may be provided as one of various components of an electronic device, such as a computer, a ultra mobile PC (UMPC), a workstation, a net-book, a personal digital assistant (PDA), a portable computer, a web tablet, a wireless phone, a mobile phone, a smart phone, an e-book, a portable multimedia player (PMP), a portable game console, a navigation system, a black box, a digital camera, a 3-dimensional (3D) television, a digital audio recorder, a digital audio player, a digital picture recorder, a digital picture player, a digital video recorder, a digital video player, a device capable of transmitting/receiving information in a wireless environment, one of various electronic devices that constitute a home network, one of various electronic devices that constitute a computer network, one of various electronic devices that constitute a telematics network, an RFID device, one of various components that constitute a computing system and the like.

In an embodiment, the semiconductor memory device 2100 or the memory system 2000 may be packaged in various forms. For example, the semiconductor memory device 2100 or the memory system 2000 may be packaged in a manner such as package on package (PoP), ball grid arrays (BGAs), chip scale packages (CSPs), plastic leaded chip carrier (PLCC), plastic dual in-line package (PDIP), die in Waffle pack, die in wafer form, chip on board (COB), ceramic dual in-line package (CERDIP), plastic metric quad flat pack (MQFP), thin quad flat pack (TQFP), small outline integrated circuit (SOIC), shrink small out line package (SSOP), thin small outline package (TSOP), thin quad flat pack (TQFP), system in package (SIP), multi-chip package (MCP), wafer-level fabricated package (WFP), wafer-level processed stack package (WSP) and the like.

Figure 11:
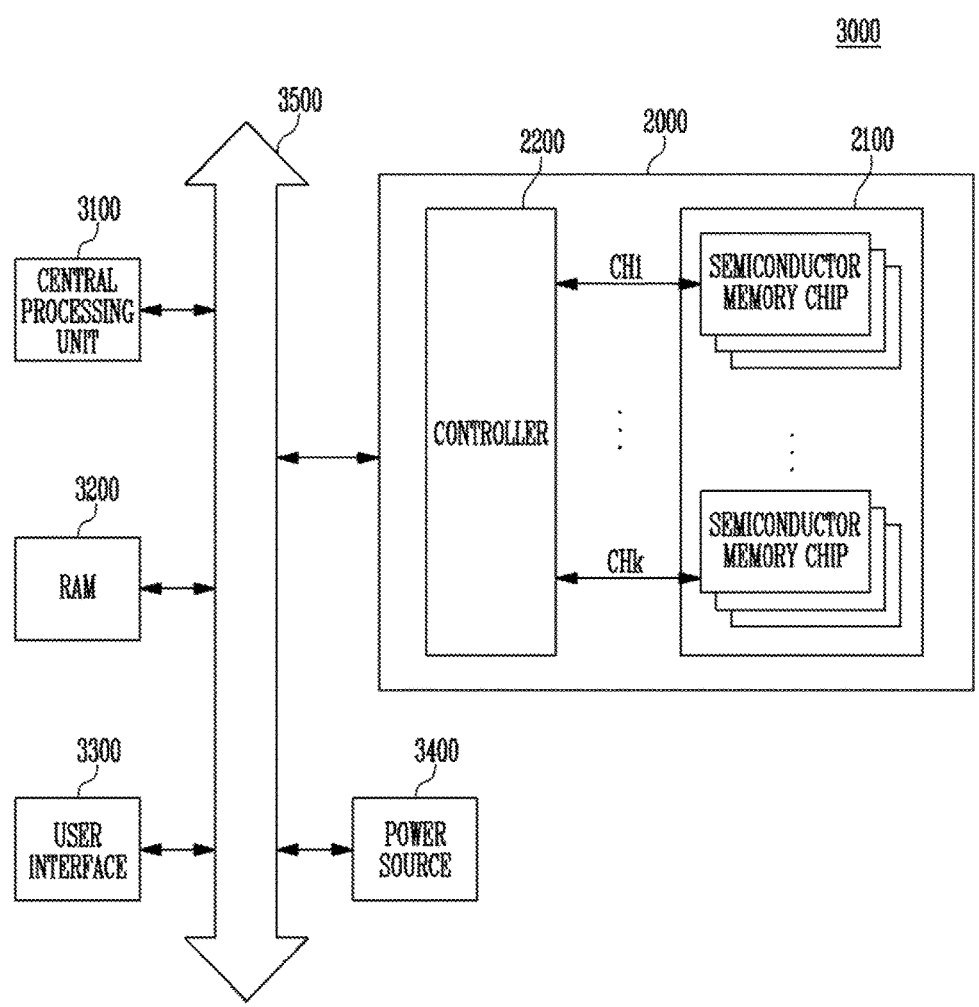
FIG. 11 is a block diagram illustrating a computing system including the memory system described with reference to FIG. 10.

FIG. 11 is a block diagram illustrating a computing system 3000 including the memory system 2000 described with reference to FIG. 10.

Referring to FIG. 11, the computing system 3000 may include a central processing unit 3100, a random access memory (RAM) 3200, a user interface 3300, a power source 3400, a system bus 3500, and the memory system 2000.

The memory system 2000 may be coupled electrically to the central processing unit 3100, the RAM 3200, the user interface 3300, and the power source 3400 through the system bus 3500. Data supplied through the user interface 3300 or data processed by the central processing unit 3100 may be stored in the memory system 2000.

In FIG. 11, it is illustrated that the semiconductor memory device 2100 is coupled to the system bus 3500 through the controller 2200. However, the semiconductor memory device 2100 may be directly coupled to the system bus 3500. In this case, the function of the controller 2200 may be performed by the central processing unit 3100 and the RAM 3200.

In FIG. 11, it is illustrated that the memory system 2000 described with reference to FIG. 10 is provided. However, the memory system 2000 may be replaced by the memory system 10 described with reference to FIG. 1. As an exemplary embodiment, the computing system 3000 may be configured to include both the memory systems 10 and 2000 described with reference to FIGS. 1 and 10.

According to the present disclosure, controller and an operating method are provided with improved operation speed.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and/or scope of the present disclosure as set forth in the following claims.

What is claimed is:

1. A controller for controlling a semiconductor memory device, the controller comprising:
a command generation unit configured to generate commands to be performed by the semiconductor memory device;
a command queue configured to store the commands and provide at least one command among the stored commands to the semiconductor memory device; and
a command removal unit configured to remove the at least one command and related commands of the at least one command from the command queue if the semiconductor memory device fails in the performance of the at least one command,
wherein the at least one command and the related commands constitute operation commands, the operation commands being used to perform a single operation, and
wherein a command constituting other operation commands different from the operation commands is not removed.

2. The controller of claim 1, wherein the related commands are commands for a physical block address equal to that corresponding to the at least one command.

3. The controller of claim 1, wherein the operation commands include at least one of program, read, and erase commands for a plurality of memory cells included in the semiconductor memory device.

4. The controller of claim 1, wherein the command removal unit searches the related commands of the at least one command among the stored commands and removes the related commands from the command queue.

5. The controller of claim 1, wherein the at least one command includes any one of erase and program commands.

6. A controller for controlling a semiconductor memory device, the controller comprising:
a command generation unit configured to generate commands to be performed by the semiconductor memory device;
a main command queue configured to store the commands and provide at least one command among the stored commands to the semiconductor memory device; and
a command mirroring unit configured to generate mirroring commands by mirroring the commands, wherein, if the semiconductor memory device fails in the performance of the at least one command, the command mirroring unit removes the at least one command and related commands of the at least one command from the mirroring commands, wherein the at least one command and the related commands constitute operation commands, the operation commands being used to perform a single operation, and wherein a command constituting other operation commands different from the operation commands is not removed.

7. The controller of claim 6, wherein the command mirroring unit generates a sub-command queue to be output to the semiconductor memory device from the mirroring commands from which the at least one command and the related commands of the at least one command are removed.

8. The controller of claim 7, further comprising a command selection unit configured to select one of the main command queue and the sub-command queue under control of the command mirroring unit and dequeue a command stored in the selected command queue.

9. The controller of claim 6, wherein the related commands are commands for a physical block address equal to that corresponding to the at least one command.

10. The controller of claim 6, wherein the operation commands include at least one of program, read, and erase commands for a plurality of memory cells included in the semiconductor memory device.

11. The controller of claim 6, wherein the at least one command includes any one of erase and program commands.

12. A method of operating a controller for controlling a semiconductor memory device, the method comprising:
  generating commands to be performed by the semiconductor memory device;
  providing at least one command among the commands to the semiconductor memory device;
  determining whether the semiconductor memory device fails in the performance of the at least one command; and
  if the semiconductor memory device fails in the performance of the at least one command, removing the at least one command and related commands of the at least one command from the commands,
  wherein the at least one command and the related commands constitute operation commands, the operation commands being used to perform a single operation, and
  wherein a command constituting other operation commands different from the operation commands is not removed.

13. The method of claim 12, further comprising storing the commands in a command queue,
  wherein providing of the at least one command comprises providing the at least one command among the stored commands to the semiconductor memory device.

14. The method of claim 13, wherein the removing of the at least one command and the related commands of the at least one command includes:
  searching the related commands of the at least one command among the stored commands; and
  removing the related commands from the command queue.

15. The method of claim 13, wherein the related commands are commands for a physical block address equal to that corresponding to the at least one command.

16. The method of claim 12, wherein the operation commands include at least one of program, read, and erase commands for a plurality of memory cells included in the semiconductor memory device.

17. The method of claim 12, wherein the at least one command includes any one of erase and program commands.

* * * * *